United States Patent
Upp

(10) Patent No.: US 8,561,135 B2
(45) Date of Patent: Oct. 15, 2013

(54) WIRELESS DEVICE AUTHENTICATION USING DIGITAL CERTIFICATES

(75) Inventor: Steven D. Upp, Bartlett, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1342 days.

(21) Appl. No.: 11/966,011

(22) Filed: Dec. 28, 2007

(65) Prior Publication Data
US 2009/0172798 A1   Jul. 2, 2009

(51) Int. Cl.
H04L 29/06   (2006.01)

(52) U.S. Cl.
USPC ............... 726/2; 726/27; 380/247; 455/410

(58) Field of Classification Search
USPC ...................... 455/410, 433; 726/2
See application file for complete search history.

(56) References Cited

U.S. PATENT DOCUMENTS

| | | | |
|---|---|---|---|
| 5,551,073 A * | 8/1996 | Sammarco | 455/411 |
| 7,433,929 B2 * | 10/2008 | Guilford et al. | 709/217 |
| 2002/0045436 A1 * | 4/2002 | Ekanayake et al. | 455/406 |
| 2004/0166874 A1 * | 8/2004 | Asokan et al. | 455/456.1 |
| 2005/0070278 A1 * | 3/2005 | Jiang | 455/432.3 |
| 2005/0101323 A1 * | 5/2005 | De Beer | 455/435.2 |
| 2005/0138178 A1 * | 6/2005 | Astarabadi | 709/227 |
| 2006/0205434 A1 * | 9/2006 | Tom et al. | 455/558 |
| 2007/0189241 A1 * | 8/2007 | Zhang | 370/338 |
| 2007/0281687 A1 | 12/2007 | Jiang | |
| 2007/0283153 A1 | 12/2007 | Metke et al. | |
| 2009/0149175 A1 * | 6/2009 | Lopresti et al. | 455/433 |

FOREIGN PATENT DOCUMENTS

| | | |
|---|---|---|
| JP | 2006237700 A | 9/2006 |
| KR | 1020060068529 A | 6/2006 |
| WO | 2005036813 A1 | 4/2005 |
| WO | 2005099220 A1 | 10/2005 |

OTHER PUBLICATIONS

"User Centric Identity Management"; Audun Josang and Simon Pope; AusCERT Conference 2005.*

* cited by examiner

*Primary Examiner* — Mohammad L Rahman

(57) ABSTRACT

A method, information processing system, and wireless device provide authentication information to a network. The method includes determining that at least one authentication context (120) resides in memory (412). The at least one authentication context (120) is analyzed to determine if at least one realm identifier associated with a home service provider is included in the at least one authentication context (120). A user is prompted to update the at least one authentication context (120) with at least one realm identifier associated with a home service provider in response to determining that at least one realm identifier fails to be included in the at least one authentication context (120). At least one realm identifier is received (612) from a user that is associated with a home service provider. The at least one authentication context (120) is updated with the at least one realm identifier received from the user.

13 Claims, 7 Drawing Sheets

WIRELESS DEVICE AUTHENTICATION USING DIGITAL CERTIFICATES

FIELD OF THE INVENTION

The present invention generally relates to the field of wireless communications, and more particularly relates to facilitating authentication and roaming by a wireless device using authentication credentials.

BACKGROUND OF THE INVENTION

Wireless communication systems have evolved greatly over the past few years. Current wireless communication systems provide multiple services such as cellular services, data services, and other services. Wireless devices are now able to utilize multiple services offered by their home service providers and visited service providers. The roaming capabilities of newer wireless devices have spawned various security concerns. For example, network operators are concerned with the authenticity of devices that they are servicing.

In 802.16 (WiMAX) systems, X.509 device certificates are being manufactured into wireless devices so that service providers can better verify the authenticity of a device. However, one problem with the current implementation of device certificates is that information associated with a home service provider or realm is not provided in the device certificate because the home service provider is not known at the time the device is manufactured. Therefore, the device certificate generally cannot be utilized as a network entry authentication credential in a roaming environment.

Therefore a need exists to overcome the problems with the prior art as discussed above.

SUMMARY OF THE INVENTION

Briefly, in accordance with the present invention, disclosed is a method, an information processing system, and a wireless device for providing authentication information to a network. The method includes determining that at least one authentication context resides in memory. The authentication context includes authentication credentials for authenticating the wireless device. The at least one authentication context is analyzed to determine if at least one realm identifier that is associated with a home service provider is included in the at least one authentication context. A user is prompted to update the at least one authentication context with at least one realm identifier associated with a home service provider in response to determining that at least one realm identifier fails to be included in the at least one authentication context. At least one realm identifier that is associated with a home service provider is received from a user. The at least one authentication context is updated with the at least one realm identifier received from the user.

In another embodiment, an information processing system communicatively coupled to a wireless communication network for managing registration requests from wireless devices is disclosed. The information processing system includes a memory and a processor that is communicatively coupled to the memory. A wireless device manager is communicatively coupled to the processor and memory. The device manager is adapted to receive a registration request from a wireless device for registering with a wireless communication network. The registration request is determined to include at least one authentication context. The authentication context includes authentication credentials for authenticating the wireless device. At least one realm identifier that is associated with a home service provider is identified from the at least one authentication context. An authentication request is transmitted to the home service provider associated with the at least one realm identifier in response to the identifying. The authentication request includes the at least one realm identifier that is associated with the home service provider.

In yet another embodiment, a wireless device is disclosed. The wireless device includes a memory and a processor that is communicatively coupled to the memory. A service manager is communicatively coupled to the memory and the processor. The service manager is adapted to determine that at least one authentication context resides in memory. The authentication context includes authentication credentials for authenticating the wireless device. The at least one authentication context is analyzed to determine if at least one realm identifier that is associated with a home service provider is included in the at least one authentication context. A user is prompted to update the at least one authentication context with at least one realm identifier associated with a home service provider in response to determining that at least one realm identifier fails to be included in the at least one authentication context. At least one realm identifier that is associated with a home service provider is received from a user. The at least one authentication context is updated with the at least one realm identifier received from the user.

One advantage of the various embodiments of the present invention is that a wireless device comprises an authentication context that includes elements such as a digital certificate, private key, and a home realm(s) associated with the device. Conventional systems include the realm within the digital certificate itself. This is problematic as device certificates are intended to be permanently written in write once memory to the device for the life of the device. The user may choose to associate the device with one or more than one home service provider over the lifetime of the device.

However, even though a digital certificate, which is generally used to authenticate a wireless device, is not updatable the authentication context of the various embodiments of the present invention is updatable to include home service provider realm information. This allows the device to identify itself to a visited network by utilizing the configured realm as part of the Network Access Identifier. The Network Access Identifier is used by the visited network equipment to route the device's request to the device's claimed home network. This allows a digital certificate, for example, installed within the device at a factory or other manufacturing facility to be used as a sole authentication credential when a wireless device is registering with a wireless network. The various embodiments also provide different methods for creating the authentication context. For example, a user can use a GUI, over-the-air programming, or other similar interfaces.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, wireless interface card, and other similar devices.

Wireless Communication System

Figure 1:
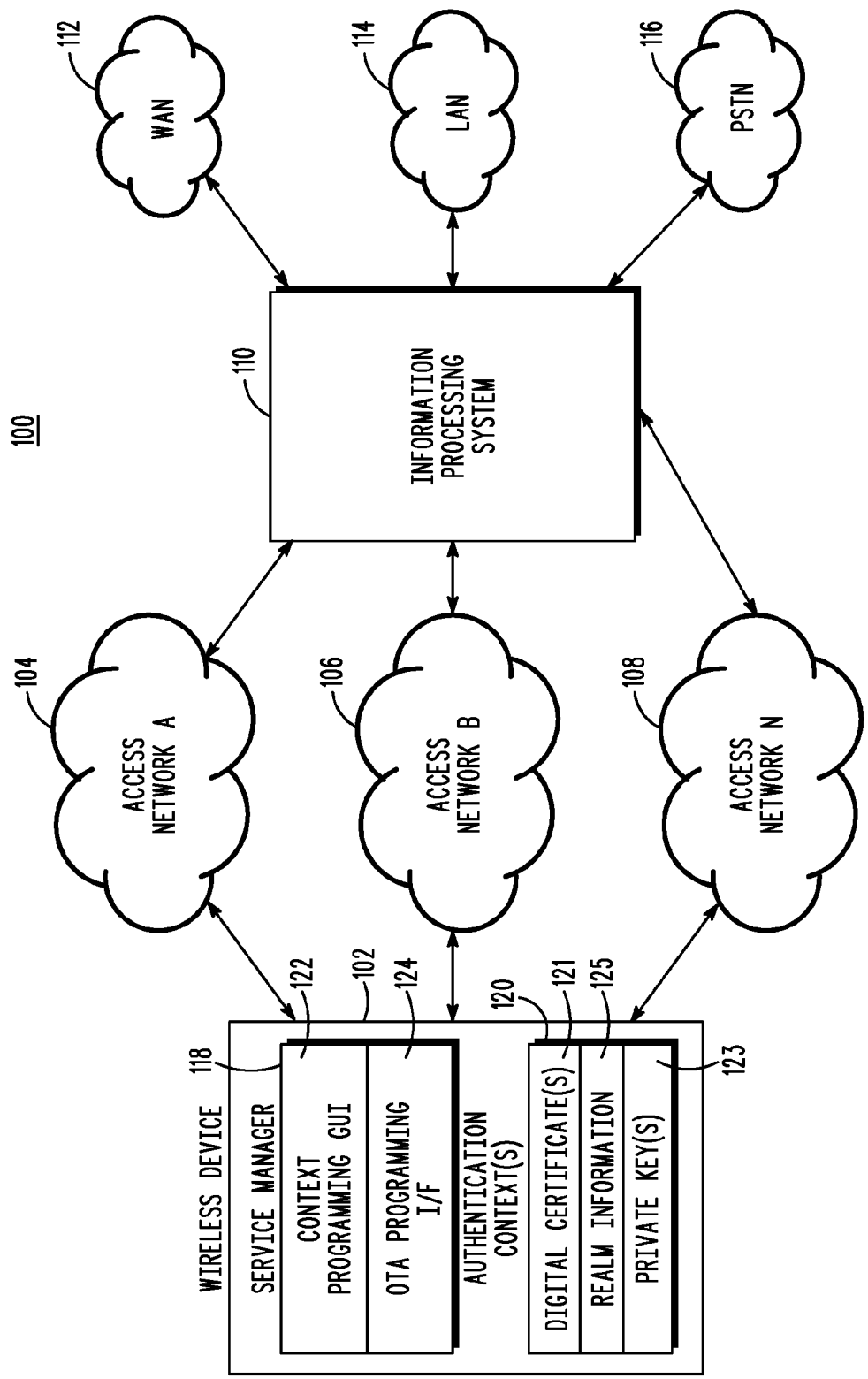
FIG. 1 is a block diagram illustrating a high level overview of a wireless communication system according to one embodiment of the present invention.

According to one embodiment of the present invention, as shown in FIG. 1, one example of a wireless communication system 100 is illustrated. FIG. 1 shows the wireless communication system 100 comprising one or more wireless devices 102 communicatively coupled to one or more access networks 104, 106, 108. The access networks 104, 106, 108, in one embodiment, can comprise one or more circuit services networks and/or data packet networks. In one embodiment, a packet data network is an IP or SIP based connectivity network, which provides data connections at much higher transfer rates then a traditional circuit services network.

A packet data network can comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network provides, among other things, voice services to the wireless device 102. It should be noted that access networks 104, 106, 108 also include additional components (not shown) such as controllers, transport/interconnect gear, network management modules, base stations, and other components that should be known to those of ordinary skill in the art.

The communications standard of the access networks 104, 106, 108 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), IEEE 802.16 family of standards, Orthogonal Frequency Division Multiplexing ("OFDM"), Orthogonal Frequency Division Multiple Access ("OFDMA"), Wireless LAN ("WLAN"), WiMAX or the like. Other applicable communications standards include those used for Public Safety Communication Networks including TErrestrial TRunked Radio ("TETRA").

Each access network 104, 106, 108 can be owned and operated by separate wireless service providers. Alternatively, two or more of the access networks 104, 106, 108 can be owned and operated by the same wireless service provider. For example, a single wireless provider can own Access Network A 104, which can be a WiMax system, and can also own Access Network B 106, which can be a cellular system. Also, one or more of the access networks 104, 106, 108 can be a home network of the wireless device 102 and the remaining access networks can be visited networks.

The wireless communications system 100 supports any number of wireless devices 102 which can be single mode or multi-mode devices. Multi-mode devices are capable of communicating over multiple access networks with varying technologies. For example, a multi-mode device can communicate over a circuit services network and a packet data that can comprise an Evolution Data Only ("EV-DO") network, a General Packet Radio Service ("GPRS") network, a Universal Mobile Telecommunications System ("UMTS") network, an 802.11 network, an 802.16 (WiMax) network, or the like. The wireless communication system 100 also includes one or more information processing systems 110 that are communicatively coupled to one or more of the access network 104, 106, 108. The information processing system(s) 110 communicatively couples the wireless device 102 to a wide area network 112, a local area network 114, and a public switched telephone network 116 through the access networks.

In one embodiment, the wireless device 102 includes a service manager 118 and one or more authentication contexts 120. An authentication context 120 includes authentication elements such as (but not limited to) a digital certificate 121 (e.g., a X.509 device certificate), an associated private key 123, and a realm 125. These elements 121, 123, 125 are used by visited networks for authenticating the wireless device 102. A digital certificate, in one embodiment, can be any standard digital certificate that is authored by a certificate authority. The digital certificate element of includes the "user" identity of the device, namely the IEEE assigned MAC address of the device 102.

The authentication context 120 allows a network to verify the identity of the wireless device 102. For example, in a WiMax system an X.509 digital certificate can be included within the wireless device 102. As discussed above, digital certificates associated with wireless devices, and X.509 certificates in particular, do not include information associated with a home service provider or realm of the wireless device 102. This is problematic because the certificate cannot be used as an authentication credential when the wireless device 102 is roaming outside its home realm.

Therefore, the wireless device 102 includes a service manager 118 that updates the authentication context 120 with home realm or service provider information 125 associated with the wireless device 102. For example, if the home realm of the wireless device 102 is carrierA.com then the authentication context 120 can be updated to identify that carrierA.com is the home realm of the wireless device 102. This is advantageous because a visited network can identify the home realm of the wireless device 102 via the authentication context 120 for authenticating the wireless device 102.

Various methods can be used for updating the authentication context 120 with home realm information 125 of the wireless device 102. In one embodiment, the service manager 118 includes a context programming GUI 122 that allows a user to update the authentication context 120 with his/her service provider/realm information 125. A user, in this embodiment, can enter the home service provider/realm information 125 directly into the device 102. For example, the user can update the authentication context 120 to include a Network Access Identifier ("NAI") of 00112233AABB@carrierA.com. In another embodiment, the service manager 118 also includes an over-the-air ("OTA") programming interface 124 for updating the authentication context 120. According to a third embodiment, the device 102 prompts the user to select realm identifier information from one or more choices presented to the user via a user interface. The one or more choices, for example, can be represented by a list of realm identifier choices that have been pre-configured in the device 102. In this way, the user can simply select one choice from a list of pre-configured realm identifiers without requiring a lot of data entry by the user at the time of the selection. According to a fourth embodiment, the wireless device 102 could utilize an air interface mechanism, such as an 802.16 air interface protocol called Network Discovery and Selection, where, according to the present invention, a set of available network service providers and their realms would be broadcasted as data over-the-air to wireless devices. The wireless device 102 would receive the broadcasted data that includes realm identifier information for the one or more available network service providers. With the received data, the wireless device 102 would configure in its memory a list of realm identifier choices currently available for the device 102. In this way, the user can simply select one choice from the list of the pre-configured realm identifiers that are configured from time to time in the wireless device 102 as the most current realm choices for the wireless device 102. The user can then select a realm for the device 102 from a list of pre-configured realm identifier choices without requiring a lot of data entry by the user.

One advantage of the various embodiments of the present invention is that a wireless device 102 can be sold to a user without pre-configuring the device 102 for use with a specific service provider. For example, a user can purchase a wireless device 102 at a retail store. At the time of purchase the wireless device 102 is not associated with any service providers allowing the device to work with any service provider. When the wireless device 102 is turned on for the first time the user can update the authentication context 120 within the device 102 to include information 125 identifying a home service provider of the user's choice. The updating can be performed via the context programming GUI 122, the OTA programming interface 124, or other similar interfaces. Another advantage is that a user can transfer service to another service provider or give/sell his device to another user. If the user transfers service providers or sells his/her device, the authentication context 120 can easily be updated to include the new realm of the new service provider.

Roaming Authentication Utilizing A Digital Certificate

Figure 2:
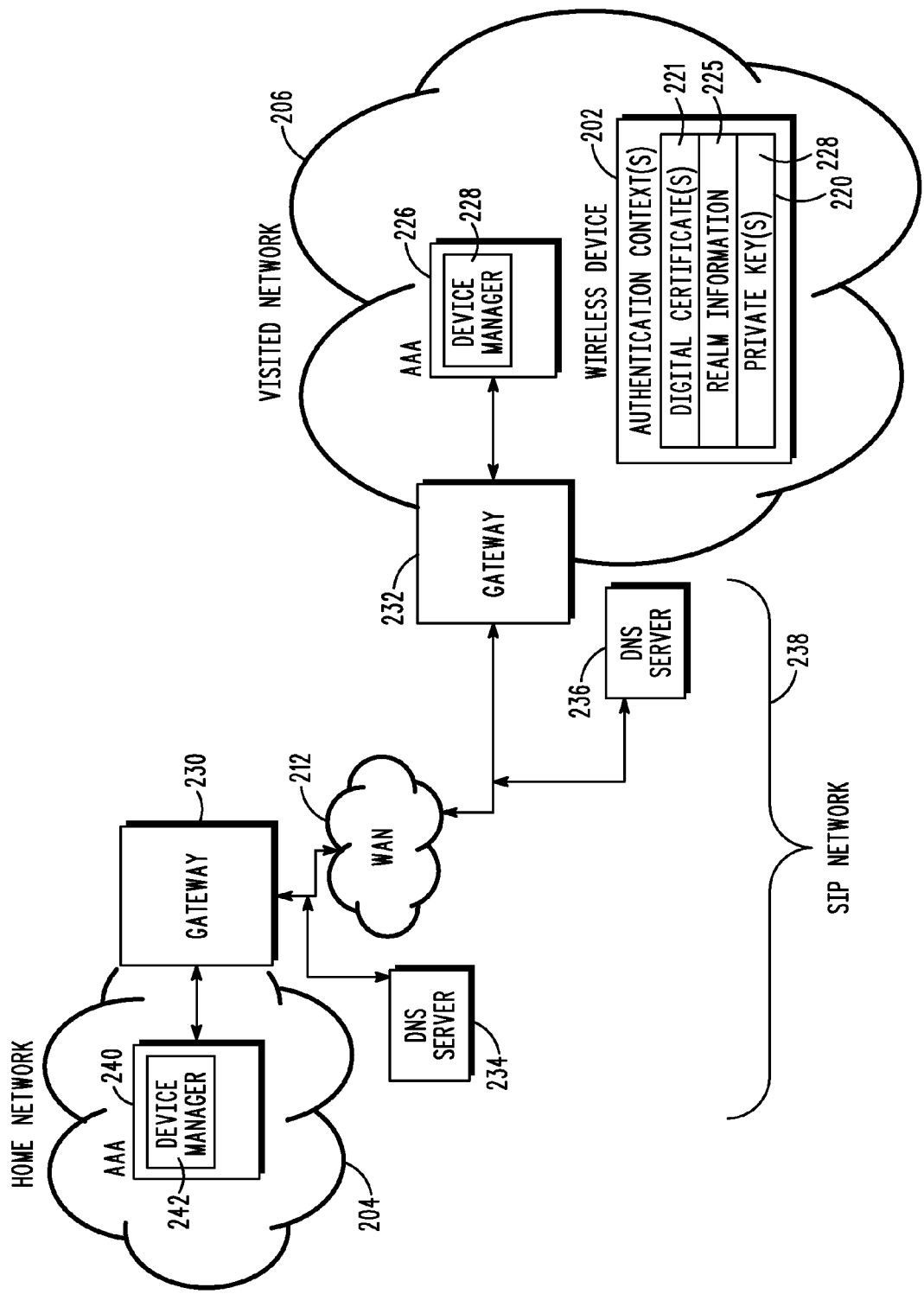
FIG. 2 is a block diagram illustrating a wireless communication system comprising a wireless device roaming in a visited network according to one embodiment of the present invention.

FIG. 2 is a block diagram illustrating an example of authenticating a wireless device 202 roaming in a visited network 206. FIG. 2 shows a plurality of networks 204, 206 communicatively coupled to each other via a WAN 212. The networks 204, 206, in one example, provide WiMax services to devices and utilize Extensible Authentication Protocol ("EAP"). The home network 204 and the visited network 206 are each communicatively coupled to each other via a SIP-based system 238 comprising a gateway 230, 232, a DNS server 234, 236, and other components.

In the example of FIG. 2, a wireless device 202 has roamed into a visited network 206. In another embodiment, a user can be traveling and purchase the wireless device 202. However, the area where the device 202 is purchased may only provide service provider A networks and the user's home service is service provider B. Therefore, the wireless device 202 is within a visited network 206.

As discussed above, the wireless device 202 comprises one or more authentication contexts 220 including information 225 for one or more home realms programmed by the user. The wireless device 202 can be a multi-mode wireless device 202 capable of communicating over a plurality of service provider networks. Therefore, the authentication context 220 can include information 225 for more than one home service realm. When the wireless device 202 registers with the visited network 206, the Authorization, Authentication, and Accounting ("AAA") server 226 of the visited network 206 receives the authentication certificate 220 of the wireless device 202 along with the realm information 225.

A device manager 228 within the AAA server 226 analyzes the authentication context 220 to identify the home realm of the wireless device 202. For example, the visited AAA server 226 reads the NAI 00112233AABB@carrierA.com to identify carrierA.com as the home realm of the wireless device 202. Once the visited AAA server 228 identifies the home realm of the device 202, it transmits the authentication context 220 to the home MA server 240. The home MA server 240 receives the authentication request from the visited network 206 and analyzes the authentication context 220 to authenticate the device 202. As discussed above, a digital certificate 221 only includes the identity of the device (e.g., 00112233AABB) and does not include the realm. Therefore, in one embodiment, the realm (e.g., carrier.com) is added by the device 202 in the NAI using the name within the digital certificate combined with the realm (e.g., 00112233MBB@carrierA.com).

For example, the device manager 242 within the home MA server 240 verifies the identity, e.g., 00112233ABB, claimed within the digital certificate element 221 of the authentication context 220 to authenticate the wireless device 202. The home MA server 240 can then send a response back to the visited AM server 226 regarding the authenticity of the device 202. Alternatively, servers (e.g., the MA servers 226, 240, gateways 230, 232, and other components) at either network 204, 206 can also comprise authentication contexts that a wireless device 202 can use to authenticate the server. As can be seen, updating an authentication context 220 within a wireless device 202 allows the context 220 to be used as the sole network entry authentication credential.

Figure 3:
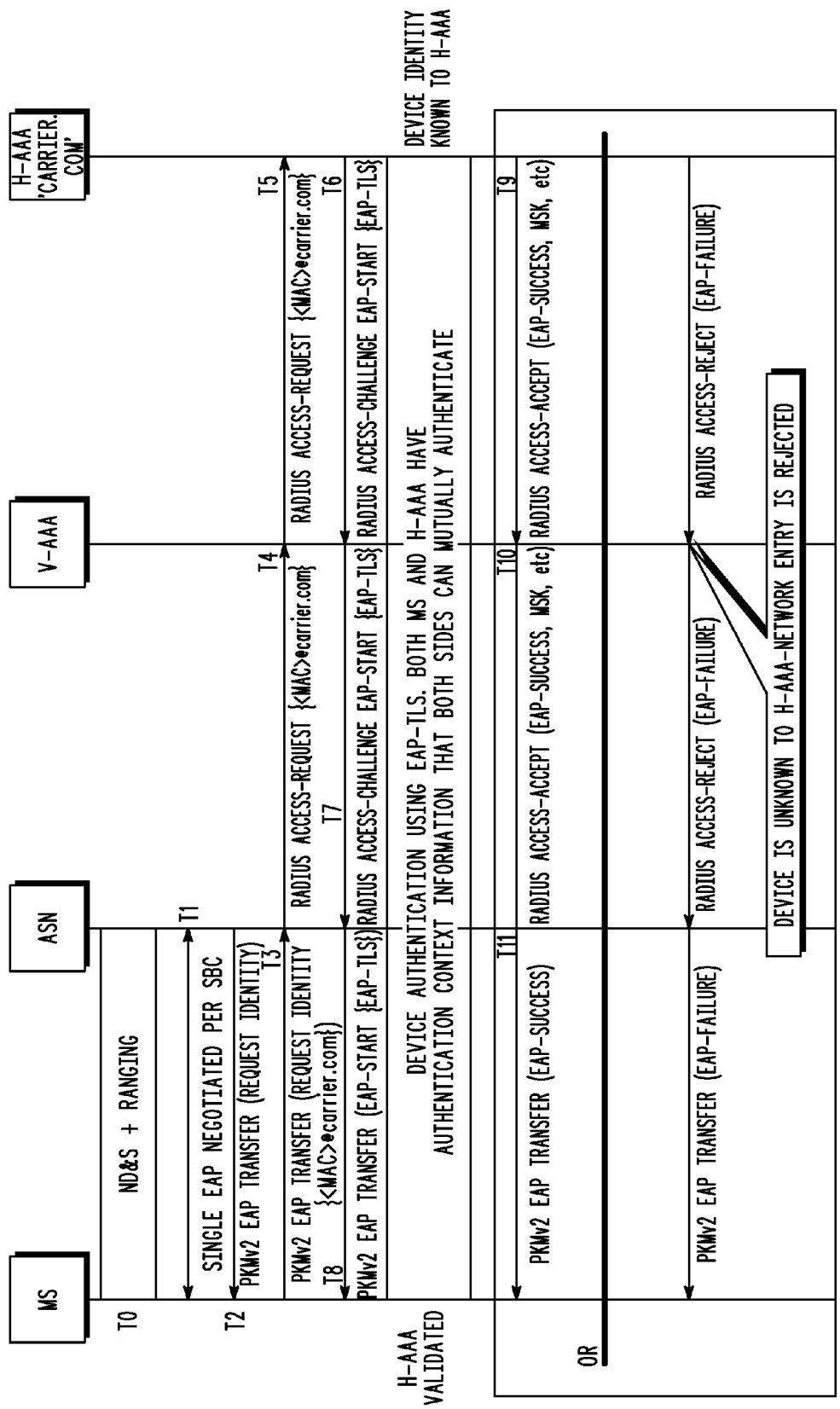
FIG. 3 is a transactional diagram illustrating authentication of a wireless device by a visited network utilizing an authentication context associated with the wireless device according to one embodiment of the present invention.

Timing Diagram Illustrating an EAP-TLS Transaction Between a Home and Visited Network FIG. 3 is a timing diagram illustrating an EAP-TLS (Transport Layer Security) transaction between a home network 204 and a visited network 206 utilizing realm information 225 within an authentication context 220 of a device 202. FIG. 3 shows an example of the authentication process for a wireless device 202 roaming in a visited network 206. It should be noted that even though FIG. 3 illustrates an example using EAP, the present invention is not limited to networks that utilize EAP. At time $T_0$ network discovery and selection ("ND&S") and ranging occurs between the wireless device 202 and an Access Service Node ("ASN"). An ASN gateway typically resides at the Operator's premise and connects to multiple WiMAX Base Stations. An ASN gateway has similar functionality to 3G base station controllers handling mobility handover management, varying levels of resource management and acts as a proxy for authentication and network mobility messages destined for a Core Service Network ("CSN").

At time $T_1$ a single EAP is negotiated per Subscriber station Basic Capability exchange ("SBC") between the ASN and the wireless device 202. The ASN, at time $T_2$, transmits an identity request in the form of a PKMv2 (Privacy Key Management version 2) EAP Transfer. The wireless device 202, at time $T_3$, responds by sending an identity response in the form of a PKMv2 EAP Transfer. The identity response, in one embodiment, can include the name (Media Access Control ("MAC") information) included within the digital certificate element 221 of the authentication context 220 and the realm information 225 ("carrier.com" information). For example, the identify response can include information in the following format "MAC@carrier.com".

The ASN receives the identity response from the wireless device 202 and sends a RADIUS Access-Request to the AAA server 226 of the visited network 206 at time $T_4$. It should be noted that present invention is not limited to RADIUS, other Authentication, Authorization, and Accounting protocols such as DIAMETER can also be used. The visited AAA server 226 uses the carrier information within the authentication context 220 to identify the home realm of the wireless device 202. The visited AAA server 226, at time $T_5$, forwards the RADIUS Access-Request including the MAC@carrier.com information of the device 102 to the home AAA server 240 of the wireless device 202.

The home AAA server 240, at time $T_6$, sends a RADIUS Access-Challenge EAP-Start (EAP-TLS) message back to the visited AAA server 226. The visited AAA server 226, at time $T_7$, forwards the RADIUS Access-Challenge EAP-Start (EAP-TLS) message to the ASN. The ASN, at time $T_8$, sends the wireless device 202 a PKMv2 EAP Transfer (EAP-Start (EAP-TLS)) message. As a result of this process each of the wireless device 202 and the home AAA server 240 can authenticate and verify one another. The home AAA server 226 now "knows" the identity of the wireless device 202 in the visited network 206.

At time $T_9$ the home AAA server 240 sends a RADIUS Access-Accept (EAP-Success, MSK, etc.) message to the visited AAA server 226 to notify it that the wireless device 202 has been verified and authenticated. The visited AAA server 226, at time $T_{10}$, then forwards the RADIUS Access-Accept (EAP-Success, MSK, etc.) message to the ASN. The ASN, at time $T_{11}$, sends a PKMv2 EAP Transfer (EAP-Success) to the wireless device 202 notifying the wireless device 202 that the home AAA server 240 has verified and authenticated it. Alternatively, if the wireless device 202 is unknown to the home AAA server 240 and cannot be verified/authenticated, the home AAA server 240 sends a RADIUS Access-Reject (EAP-Failure) message to the visited AAA server 226. The visited AAA server 226 forwards the RADIUS Access-Reject (EAP-Failure) message to the ASN, which notifies the wireless device 202 that is has not been authenticated.

Wireless Device

Figure 4:
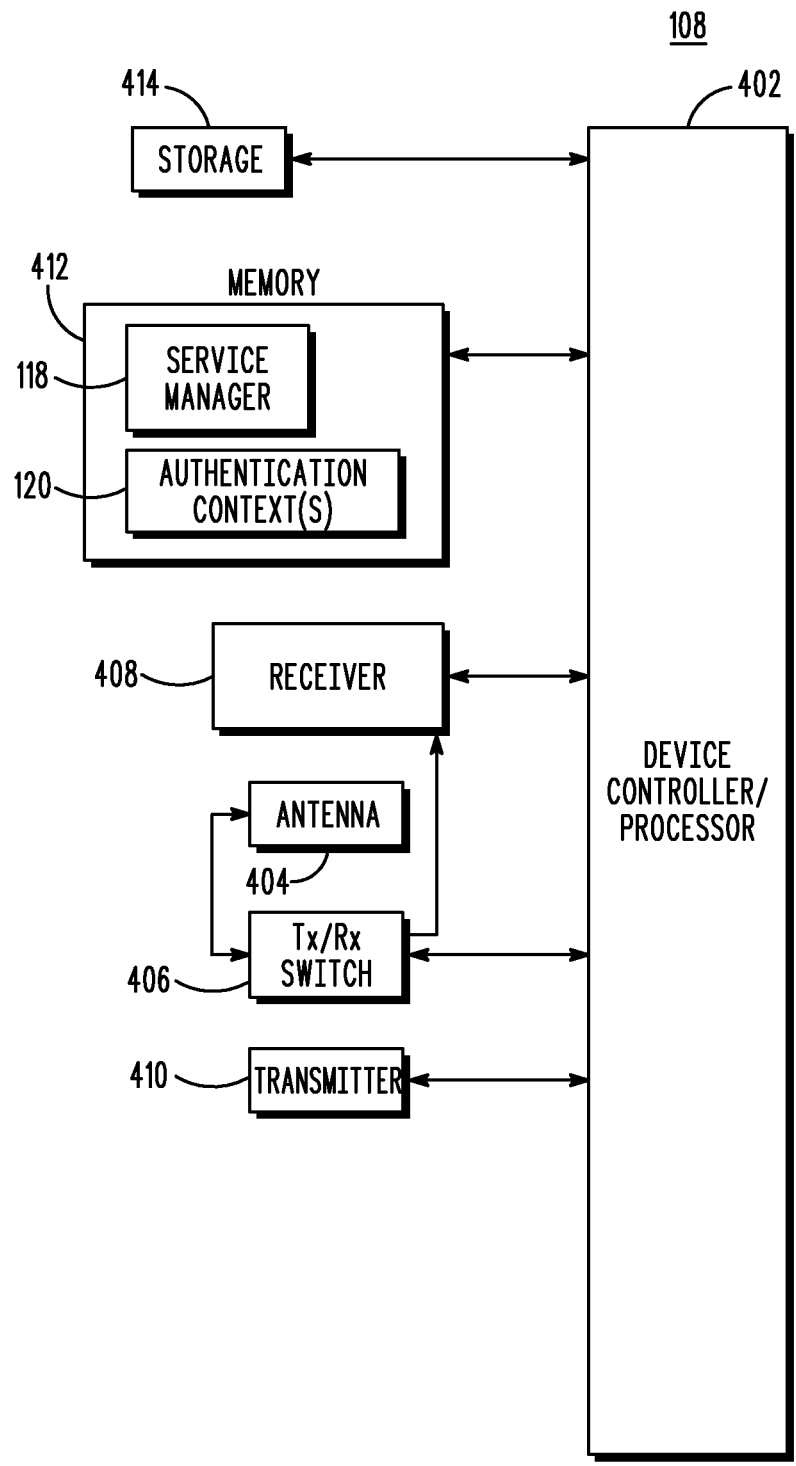
FIG. 4 is a block diagram illustrating a wireless communication device according to one embodiment of the present invention.

FIG. 4 is a block diagram illustrating a detailed view of the wireless device 102 according to one embodiment of the present invention. It is assumed that the reader is familiar with wireless communication devices. To simplify the present description, only that portion of a wireless communication device that is relevant to the present invention is discussed. The wireless device 102 operates under the control of a device controller/processor 402, that controls the sending and receiving of wireless communication signals. In receive mode, the device controller 402 electrically couples an antenna 404 through a transmit/receive switch 406 to a receiver 408. The receiver 408 decodes the received signals and provides those decoded signals to the device controller 402.

In transmit mode, the device controller 402 electrically couples the antenna 404, through the transmit/receive switch 406, to a transmitter 410. It should be noted that in one embodiment, the receiver 408 and the transmitter 410 are a dual mode receiver and a dual mode transmitter for receiving/transmitting over various access networks providing different air interface types. In another embodiment a separate receiver and transmitter is used for each of type of air interface.

The device controller 402 operates the transmitter and receiver according to instructions stored in the memory 412. These instructions include, for example, a neighbor cell measurement-scheduling algorithm. The memory 412, in one embodiment, also includes the service manager 118 and the authentication context(s) 120. These components have been discussed in greater detail above.

The wireless device 102, also includes non-volatile storage memory 414 for storing, for example, an application waiting to be executed (not shown) on the wireless device 102. The wireless device 102, in this example, also includes an optional local wireless link 416 that allows the wireless device 102 to directly communicate with another wireless device without using a wireless network. The optional local wireless link 416, for example, is provided by Bluetooth, Infrared Data Access (IrDA) technologies, or the like.

Information Processing System

Figure 5:
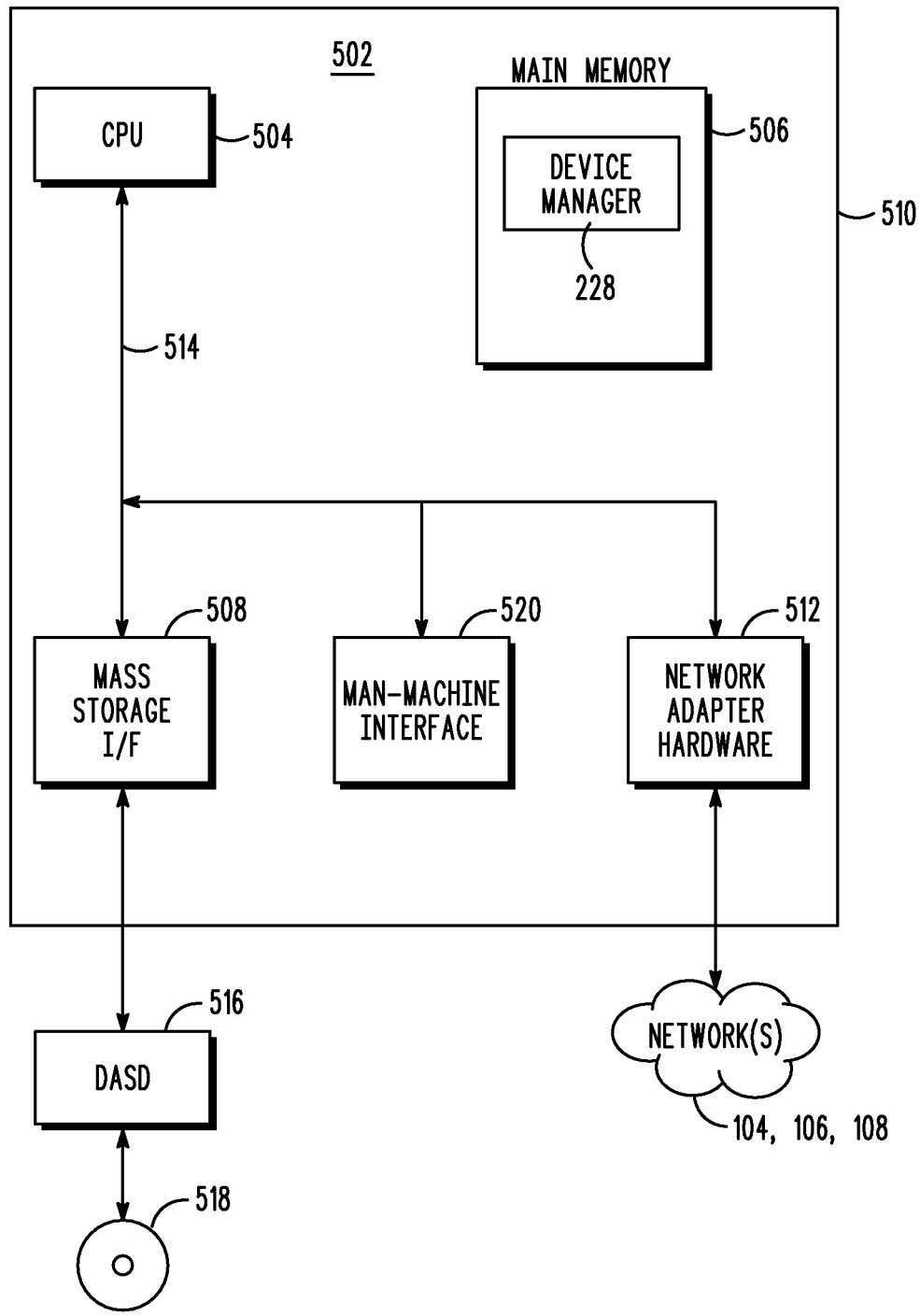
FIG. 5 is a block diagram illustrating an information processing system according to one embodiment of the present invention.

FIG. 5 is a block diagram illustrating a more detailed view of an information processing system 510 such as the gateway 110, AAA servers 228, 240, or the like. The information processing system 510 is based upon a suitably configured processing system adapted to implement the embodiment of the present invention. For example, a personal computer, workstation, or the like, may be used. The information processing system 510 includes a computer 502. The computer 502 has a processor 504 that is connected to a main memory 506, a mass storage interface 508, a man-machine interface 520, and network adapter hardware 512. A system bus 514 interconnects these system components.

The main memory 506 includes at least the wireless device manager 228, which has been discussed in greater detail above. Although illustrated as concurrently resident in the main memory 506, it is clear that respective components of the main memory 506 are not required to be completely resident in the main memory 506 at all times or even at the same time. One or more of these components can be implemented as hardware.

The data storage device 516 can store data on a hard-drive or media such as a CD 518. Although only one CPU 504 is illustrated for computer 502, computer systems with multiple CPUs can be used equally effectively. Some embodiments of the present invention further incorporate interfaces that each includes separate, fully programmed microprocessors that are used to off-load processing from the CPU 504. The man-machine interface 520 allows technicians and/or administrators to directly connect to the information processing system 510.

An operating system (not shown) included in the main memory is a suitable multitasking operating system such as Linux, UNIX, Windows XP, and Windows Server. Embodiments of the present invention are able to use any other suitable operating system. Some embodiments of the present invention utilize architectures, such as an object oriented framework mechanism, for executing instructions of the components of operating system (not shown) on any processor located within the information processing system 510.

The network adapter hardware 512 is used to provide an interface to the access networks 104, 106, 108 and other networks. Embodiments of the present invention are able to be adapted to work with any data communications connections including present day analog and/or digital techniques or via a future networking mechanism. Although the embodiments of the present invention are described in the context of a fully functional computer system, those of ordinary skill in the art will appreciate that embodiments are capable of being distributed as a program product via floppy disk, e.g., CD/DVD 518, or other form of recordable media, or via any type of electronic transmission mechanism.

Figure 6:
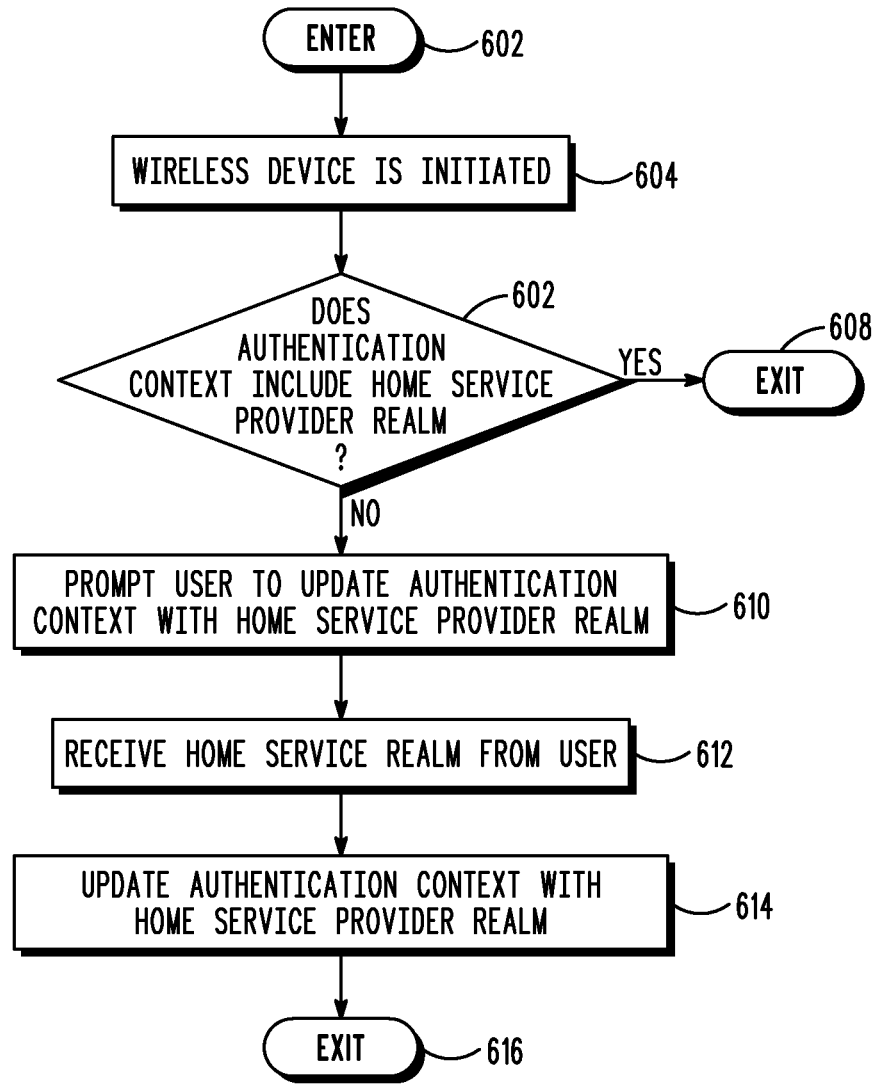
FIG. 6 is an operational flow diagram illustrating a process of updating a wireless device authentication context to include home service provider information according to one embodiment of the present invention.

Process Of Updating An Authentication Context With Home Service Provider Information FIG. 6 is an operational flow diagram illustrating a process of updating an authentication context of a wireless device 102 with its home service provider/realm information 125. The operational flow diagram of FIG. 6 begins at step 602 and flows directly to step 604. The wireless device 102, at step 604, is initiated. For example, the wireless device 102 is turned on for the first time by a user or any other subsequent time. The service manager 118, at step 606, determines if an authentication context 120 within the device 102 includes home service provider realm information 125. If the result of this determination is positive, the control flow exits at step 608. If the result of this determination is negative, the user, at step 610, is prompted to update the authentication context 120 with the home realm information 125.

The wireless device 102, at step 612, receives home realm information 125 from the user. For example, the user can program realm information 125 into the authentication context 120 via a GUI 122 or an OTA interface 124. In another embodiment, the user does not need to be prompted to update the authentication context 120, but can update the authentication context 120 at any time. The service manager 118, at step 614, updates the authentication context 120 with home realm information 125. The control flows exits at step 616.

Figure 7:
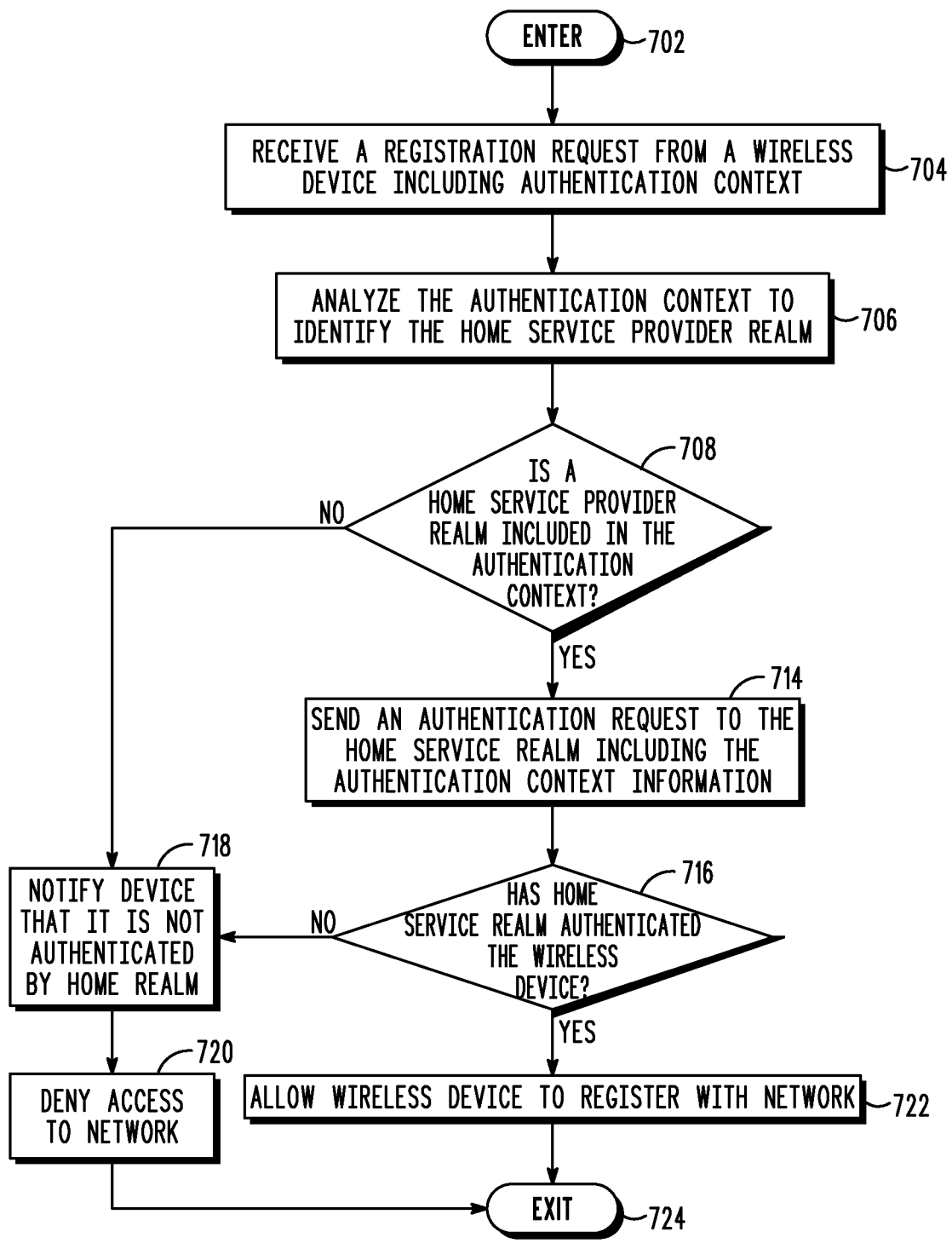
FIG. 7 is an operational flow diagram illustrating a process of authenticating a wireless device via home service provider information included within an authentication context associated with wireless device according to one embodiment of the present invention.

Process Of Authenticating A Roaming Device Using Home Realm Information Within Its Digital Certificate FIG. 7 is an operational flow diagram illustrating an example of a process of authenticating a roaming wireless device 202 via home realm information 225 included in an authentication context 220 associated with the wireless device 202. The operational flow diagram of FIG. 7 begins at step 702 and flows directly to step 704. An information processing system such as a visited home AAA server 226, at step 704, receives a registration request from a wireless device 102 including an authentication context 220. The visited AAA server 226, at step 706, analyzes the authentication context 220 to identify the home service provider realm of the wireless device 202.

The visited AAA server 226, at step 708, determines if home service provider/realm information 225 is included within the authentication context 220. If the result of this determination is negative, the visited AAA server 226, at step 718, notifies the wireless device 202 that it has not been authenticated by the home service provider. The visited AAA server 226, at step 720, denies the wireless device 102 access to the visited network.

If the result of the determination at step 708 is positive, the visited AAA server 226, at step 714, sends an authentication request to the home service provider including the authentication context 220 including the realm information 125. The visited AAA server 226, at step 716, determines if the home service provider has authenticated the wireless device 202. If the result of this determination is negative, the visited AAA server 226, at step 718, notifies the wireless device 202 that it has not been authenticated by the home service provider. The visited AAA server 226, at step 720, denies the wireless device 102 access to the visited network. If the result of the determination is positive, the visited AAA server 226, at step 722, allows the wireless device 202 to register with the visited network 206. The control flow then exits at step 724.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a wireless device, for providing authentication information to a network, the method comprising:
   determining that at least one authentication context resides in memory, wherein the authentication context includes authentication credentials for authenticating the wireless device;
   analyzing the at least one authentication context to determine if at least one realm identifier associated with a home service provider is included in the at least one authentication context and wherein the realm identifier identifies a home realm of the wireless device and includes a unique wireless device identifier and an identifier associated with the home service provider of the wireless device;
   prompting, in response to determining that at least one realm identifier fails to be included in the at least one authentication context, a user to update the at least one authentication context with at least one realm identifier associated with a home service provider;
   receiving from a user at least one of
      a user selection of at least one realm identifier associated with a home service provider, and
      user data entry identifying at least one realm identifier associated with a home service provider; and
   updating, in response to the receiving, the at least one authentication context with the at least one realm identifier received from the user.

2. The method of claim 1, further comprising:
   detecting a wireless communication network; and sending a registration request including the at least one authentication context comprising the at least one realm identifier, wherein the at least one authentication context is used as an authentication credential by the wireless communication network.

3. The method of claim 1, wherein the authentication context comprises an immutable digital certificate and private key.

4. The method of claim 3, wherein the immutable digital certificate is a X.509 digital certificate.

5. The method of claim 1, wherein the receiving further comprises:
receiving the at least one realm identifier associated with a home service provider from the user via a graphical user interface.

6. The method of claim 1, wherein the receiving further comprises:
receiving an over-the-air update comprising the at least one realm identifier associated with a home service provider.

7. The method of claim 1, wherein the updating further comprises:
updating the authentication context with a plurality of home service provider realm identifiers.

8. A wireless device comprising:
a memory;
a processor; and
a service manager communicatively coupled to the memory and the processor, wherein the service manager is adapted to:
determine that at least one authentication context resides in memory, wherein the authentication context includes authentication credentials for authenticating the wireless device;
analyze the at least one authentication context to determine if at least one realm identifier associated with a home service provider is included in the at least one authentication context, wherein the at least one realm identifier includes a unique wireless device identifier and an identifier associated with the home service provider realm of the wireless device;
prompt, in response to determining that at least one realm identifier fails to be included in the at least one authentication context, a user to update the at least one authentication context with at least realm identifier associated with a home service provider and wherein the realm identifier identifies a home realm of the wireless device;
receive at least one realm identifier from a user; and
update, in response to the at least one realm identifier being received, the at least one authentication context with the at least realm identifier received from the user.

9. The wireless device of claim 8, wherein the service manager is further adapted to:
detect a wireless communication network; and
send a registration request including the at least one authentication context comprising the at least one realm identifier, wherein the at least one authentication context is used as an authentication credential by the wireless communication network.

10. The wireless device of claim 8, wherein the authentication context comprises a digital certificate.

11. The wireless device of claim 10, wherein the digital certificate is a X.509 digital certificate.

12. The wireless device of claim 8, wherein the service manager is further adapted to receive by:
receiving the at least one realm identifier associated with a home service provider from the user via a graphical user interface; and
receiving an over-the-air update comprising the at least one realm identifier associated with a home service provider.

13. The wireless device of claim 8, wherein the service manager is further adapted to update by:
updating the authentication context with a plurality of home service provider realm identifiers.

\* \* \* \* \*